(12) United States Patent
Kittel et al.

(10) Patent No.: US 8,290,540 B2
(45) Date of Patent: Oct. 16, 2012

(54) DISPLAY DEVICE MANAGING METHOD

(75) Inventors: Kay Kittel, Poing (DE); Klaus Lukas, Munich (DE); Michael Lutzeler, Neubiberg (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 813 days.

(21) Appl. No.: 11/885,144

(22) PCT Filed: Feb. 17, 2006
(Under 37 CFR 1.47)

(86) PCT No.: PCT/EP2006/060068
§ 371 (c)(1),
(2), (4) Date: May 26, 2009

(87) PCT Pub. No.: WO2006/092362
PCT Pub. Date: Sep. 8, 2006

(65) Prior Publication Data
US 2009/0298545 A1 Dec. 3, 2009

(30) Foreign Application Priority Data
Feb. 28, 2005 (DE) .......................... 10 2005 009 105

(51) Int. Cl.
*H04M 1/00* (2006.01)

(52) U.S. Cl. ........................................ 455/566; 345/660

(58) Field of Classification Search .................... 455/566
See application file for complete search history.

(56) References Cited

U.S. PATENT DOCUMENTS

| | | | | |
|---|---|---|---|---|
| 5,060,170 A * | 10/1991 | Bourgeois et al. | ............ | 715/788 |
| 5,371,847 A * | 12/1994 | Hargrove | ...................... | 715/788 |
| 5,577,187 A * | 11/1996 | Mariani | ........................ | 715/792 |
| 5,657,463 A | 8/1997 | Bingham | | |
| 5,666,498 A * | 9/1997 | Amro | ............................ | 715/800 |
| 5,675,755 A * | 10/1997 | Trueblood | ..................... | 715/791 |
| 5,680,562 A * | 10/1997 | Conrad et al. | ................. | 715/797 |
| 5,684,969 A * | 11/1997 | Ishida | ............................. | 715/800 |
| 5,796,402 A | 8/1998 | Ellison-Taylor | | |
| 5,838,318 A * | 11/1998 | Porter et al. | ................... | 715/790 |
| 5,990,880 A * | 11/1999 | Huffman et al. | .............. | 345/660 |
| 6,593,943 B1 * | 7/2003 | MacPhail | ...................... | 715/734 |
| 6,873,345 B2 * | 3/2005 | Fukuda et al. | ................. | 715/807 |
| 6,940,530 B2 * | 9/2005 | Chen et al. | .................... | 345/660 |

(Continued)

FOREIGN PATENT DOCUMENTS

EP 0 412 924 B1 2/1995

OTHER PUBLICATIONS

International Search Report for International Application No. PCT/EP2006/060068; mailed Jun. 9, 2006; 2 pages.

*Primary Examiner* — Hai Nguyen

(57) ABSTRACT

The invention relates to a method for managing a display device (DSP) of a portable communications device (MFG) having the following characteristics: said display device is used for displaying graphical subject matter, it also comprises a processing device (LAE) for carrying out first and second applications, each of which has an output subject matter. A control device (IM) for managing the graphical display surface of the display device is also provided, wherein the control device of the first application allocates a first display area and the control device of the second application allocates a second display area in such a way that no overlap of said display areas is produced, thereby avoiding the harmful influence of the first performed application on the second later invoked application.

18 Claims, 3 Drawing Sheets

U.S. PATENT DOCUMENTS

| | | | |
|---|---|---|---|
| 7,106,298 B1* | 9/2006 | Turner et al. | 345/156 |
| 7,298,275 B2* | 11/2007 | Brandt et al. | 340/573.1 |
| 7,362,311 B2* | 4/2008 | Filner et al. | 345/169 |
| 7,370,284 B2* | 5/2008 | Andrea et al. | 715/788 |
| 7,440,875 B2* | 10/2008 | Cuthbert et al. | 703/2 |
| 7,457,973 B2* | 11/2008 | Liu | 713/310 |
| 7,469,388 B1* | 12/2008 | Baudisch et al. | 715/856 |
| 7,496,484 B2* | 2/2009 | Agrawala et al. | 703/2 |
| 7,496,845 B2* | 2/2009 | Deutscher et al. | 715/726 |
| 7,508,374 B2* | 3/2009 | Tsunoda | 345/158 |
| 7,570,656 B2* | 8/2009 | Raphaeli et al. | 370/445 |
| 7,576,757 B2* | 8/2009 | Kariathungal et al. | 345/637 |
| 7,712,026 B2* | 5/2010 | Kobashi et al. | 715/243 |
| 7,738,684 B2* | 6/2010 | Kariathungal et al. | 382/128 |
| 7,757,167 B2* | 7/2010 | Kobashi et al. | 715/243 |
| 7,761,791 B2* | 7/2010 | Kobashi et al. | 715/253 |
| 7,805,672 B2* | 9/2010 | Kobashi | 715/252 |
| 7,900,139 B2* | 3/2011 | Hosotsubo | 715/247 |
| 2001/0010525 A1* | 8/2001 | Fukuda et al. | 345/788 |
| 2002/0049858 A1* | 4/2002 | Frietas et al. | 709/246 |
| 2002/0054117 A1* | 5/2002 | van Dantzich et al. | 345/766 |
| 2003/0142141 A1* | 7/2003 | Brown et al. | 345/805 |
| 2003/0174160 A1* | 9/2003 | Deutscher et al. | 345/716 |
| 2003/0231190 A1* | 12/2003 | Jawerth et al. | 345/660 |
| 2004/0194131 A1* | 9/2004 | Ellis et al. | 725/34 |
| 2005/0107993 A1* | 5/2005 | Cuthbert et al. | 703/2 |
| 2005/0108655 A1* | 5/2005 | Andrea et al. | 715/798 |
| 2006/0107204 A1* | 5/2006 | Epstein | 715/517 |
| 2006/0123335 A1* | 6/2006 | Sanchez et al. | 715/517 |
| 2006/0139319 A1* | 6/2006 | Kariathungal et al. | 345/156 |
| 2006/0235945 A1* | 10/2006 | Frietas et al. | 709/217 |
| 2006/0288389 A1* | 12/2006 | Deutscher et al. | 725/88 |
| 2010/0095241 A1* | 4/2010 | Nagano et al. | 715/790 |

* cited by examiner

DISPLAY DEVICE MANAGING METHOD

CROSS-REFERENCE TO RELATED PATENT APPLICATIONS

The present Application is a national stage filing under 35 USC §371 of PCT Patent Application No. PCT/EP2006/060068 titled "Display Device Managing Method" filed on Feb. 17, 2006 which published under PCT Article 21(2) on Sep. 8, 2006 as WO 2006/092362 A1 in the German language and claims priority under 35 USC §119 to German Patent Application No. 10 2005 009 105.9 filed on Feb. 28, 2005 (which are hereby incorporated herein by reference in their entirety.).

BACKGROUND

The present invention relates to a method for managing a display device of a portable communication unit as well as a portable communication unit incorporating a display device for displaying graphic content.

Modern portable and mobile communication units such as mobile telephones allow, besides basic communication functions, the execution of applications, i.e. software programs or software applications, which are executed by a processor in the mobile phone. Basic functions such as system, network and service management as well as applications share the available display devices for their visual output. Moreover, in most cases, the visual output surface is not split into several physical units or devices and various applications have to share one physical display. If this display is being used by an application, no visual output surface of the display is normally available to other applications and basic functions for outputting their graphic output content. There is only the possibility of overwriting the display areas of the application or foreground applications which were executed previously. However, this is usually distracting and inconvenient for the user because it hampers the user when executing foreground applications.

BRIEF DESCRIPTION OF THE FIGURES

Exemplary embodiments of the present invention are explained in greater detail below, reference being made to the accompanying drawings. These are as follows.

DESCRIPTION OF EXEMPLARY EMBODIMENTS

Figure 1:
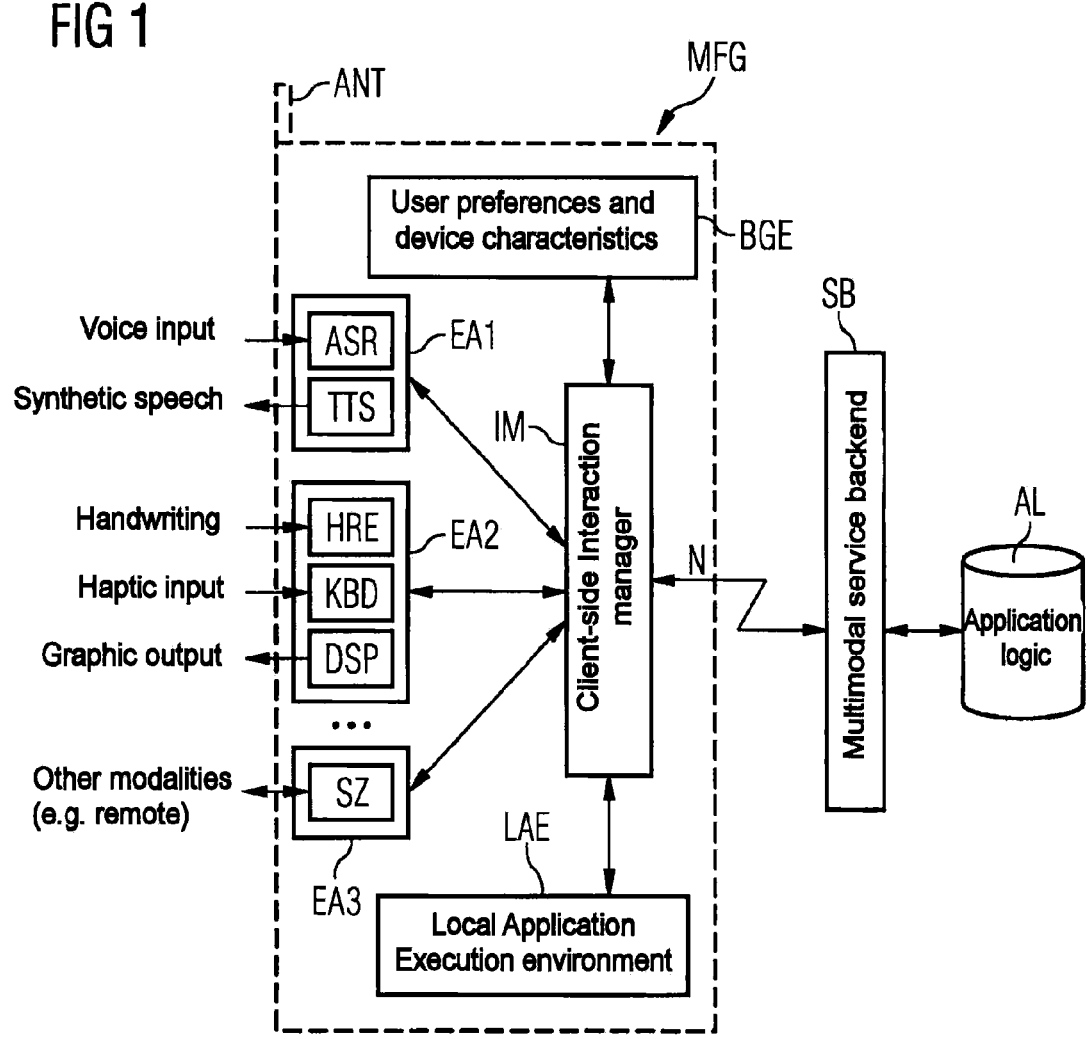
FIG. 1 is a schematic view of the architecture of a portable communication unit designed as a mobile phone in accordance with one exemplary embodiment of the invention.

Many embodiments are directed to ways of managing a display and/or its display surface so as to ensure a first application is hampered by a second application as little as possible when outputting graphical content.

The method for managing a display device and a display of a portable communication unit may involve one or more of the following steps. A first application (software application) is initially executed on the portable communication unit. This application provides graphical output content for display on the display device. A first display area of the display device is then assigned to the first application and its first graphical output content in order to output the first graphical output content. A second application (software application) is then executed on the portable communication unit. This second application accordingly provides second graphical output content for display on the display device. A second display area of the display device is then assigned to the second application in order to output the second graphical output content with assignment of the relevant display areas being performed so that they do not overlap. This has the advantage that the first application remains fully controllable (e.g. fully controllable) despite display of the graphical content of the second application. A user may not, for instance, first have to deal with the content of the second application before being able to continue working with the first application. Assignment of the first display area and the second display area is advantageously performed automatically (by a device in the portable communication unit) so that the user does not have to manage the display surface of the display device himself. According to one embodiment of the method, a first display area is initially assigned to the first application and then adapted in order to define and determine the second display area for the second application. This means that, for example, if a large portion of the entire available display surface of the display device or the entire display surface is made available to the first application as the first display area because this application is initially the only application that is being executed on the mobile communication unit, this first display area is then adapted when a second application is executed and/or at the time when a second application provides graphic output content. It is feasible to adapt the size or even the position of the first display area. Especially in cases where the first display area takes up the entire or almost the entire display surface of the display device, the first display area is initially reduced in order to define the second display area for the second application. Nevertheless, it is also feasible to shift the position of the first display area relative to the entire display surface. This way it is possible to ensure that the first display area and the second display area do not overlap and display is not adversely affected.

According to another advantageous embodiment, display areas for outputting the graphic output content of applications are defined and assigned in accordance with predetermined rules. These rules can be invariable and preset or can be specified by the user. These rules can be as follows. It is feasible to assign a priority (degree of importance) to the first and/or to the second application respectively. This priority can be assigned by the user. Is also feasible for an application to specify and assign a specific priority itself. System applications in particular will assign themselves a high priority because they usually provide messages that are important for maintaining operation of the communication unit. The size of a particular display area can be determined depending on the priority assigned. More precisely, a larger display area can be assigned to an application with a higher priority.

According to another possible embodiment, a minimum required display area for executing an application is stipulated when defining a display area for an application. This minimum required display area can be defined by an application itself or it can be adapted by the user. It is possible for an application to initially specify a minimum required display area and for the user to adapt and increase the minimum required display area to suit his needs, for instance because his eyesight is poor. Furthermore, it is also possible for there to be a combination of priority criteria for the minimum required display area. According to one embodiment, it is possible to stipulate a rule that at least the minimum required display area must be assigned to the application having the higher priority.

According to another advantageous embodiment, there can be a rule for defining display areas which states that the size of the relevant display area for an application is determined and adapted depending which application was executed first. It is also feasible for the size of the display area for an application to be determined and adapted depending which of the applications provides graphic output content for display on the display device first. In particular, a larger display area can be assigned to the application which was executed first. This means that if the first application is executed first and is therefore the foreground application, it is possible for its display area to be reduced due to execution of a second application but to still take up a larger part of the display surface than the second application. Here too, it is possible for there to be a combination of various rules and criteria for defining display areas. If, for example, the first application is launched or executed earlier than the second application and if a higher priority is assigned to the second application than to the first application and both applications have defined a minimum required display area, it is possible for the second application with the higher priority to be assigned the minimum required display area for its execution whereas the first application is assigned the first display area which comprises the remaining display surface of the display device, excluding the second display area. This will normally be the larger display area. This example shows that it is also possible to grade individual criteria for defining the display area in terms of their importance. Whereas the minimum required display area for the higher priority application (the second application) must be met in every case, according to the example, the criterion is that a larger display area is only assigned to the application executed first if this is still possible on the display surface.

According to another embodiment, when reducing the first display area due to assignment of a second display area, the scaling and resolution of the first graphic output content is advantageously adapted so that the entire first output content can continue to be displayed on the display device. If the display area for the graphic output content was merely reduced, it is possible that some output content might not be displayed, but this is prevented by scaling the output content appropriately to the adapted or reduced display area. According to another aspect of the invention, a portable communication unit with one or more of the following features has been devised. It has a display device with a display surface for displaying graphic content. It also has a processor for executing a first application and a second application which each provide graphic output content. Finally, it has a controller for managing the graphic display surface of the display device whereby the controller assigns, on the display surface of the display device, a first display area to the first application and a second display area to the second application in such a way that there is no overlapping of the display areas. This means that display areas are not allocated by the actual applications because they are unaware of the requirements of other applications. The controller has the best overview of the requirements of executed applications and this is why it can assign the resources of the display device in a needs-based manner. As mentioned earlier, display areas for the graphic output content of the relevant applications can be assigned in accordance with specific rules. These rules can be invariable and predetermined or, optionally, they can also be adapted by the user to suit his needs. The use of (possibly adapted) rules means that the user does not have to manage the display surface manually during operation of the portable communication unit and management can be performed by the controller. For an explanation of the possible rules for determining and assigning display areas for the graphic output content of applications, the reader is referred to the method described above. In particular, the reader's attention is drawn to the possibilities or rules which can be applied by the controller if a first display area is initially assigned to the first application but then (after execution of a second application starts) subsequently has to be adapted in terms of its size or position on the display surface, for example, in order to define the second display area for the second application.

According to one advantageous embodiment, the portable communication unit is designed as a mobile radio device and/or a portable computer. The mobile radio device can be designed as a mobile phone and the portable computer can be designed as a Personal Digital Assistant (PDA) or Organiser.

Before going on to explaining the exemplary methods for managing the display surface of a portable communication unit, a portable communication unit according to one of the exemplary embodiment of the invention which is designed to use the method is first explained. FIG. 1 shows a portable communication unit which essentially has a multimodal architecture in accordance with an Open Mobile Alliance (OMA) specification. This portable communication unit, designed as mobile phone MFG for example, has the following components. Besides antenna ANT and appropriate mobile communication modules (not shown) which, for example, operate in accordance with the Global System for Mobile Communications (GSM) or Universal Mobile Telecommunications System (UMTS) standard, mobile phone MFG comprises various input/output devices EA1, EA2 and EA3 for inputting voice, handwriting etc. and for outputting voice, graphic content etc. An Automatic Speech Recognition (ASR) device is used to capture and recognize voice input signals from the user. Correspondingly, voice output device TTS is used to convert text stored in the mobile phone which is to be communicated to the user into speech (as part of a text-to-speech method). Handwriting capture device HRE is used to capture and recognize the user's handwriting in order to derive control instructions from this. Handwriting recognition can be obtained; for example, by using a built-in sensor, for instance an acceleration sensor, or a sensor which can be connected to mobile phone MFG and which captures the movement made by a user to describe a character and uses a handwriting recognition system to convert this into control instructions. Besides handwriting recognition, it is also feasible to input characters and control instructions into the mobile phone by using haptic input means, for example keypad KBD. A display device DSP which is capable of outputting the graphic content of applications or software applications can be provided for outputting information for the user. Other input/output devices (User Agents) which provide other interfaces of mobile phone MFG with its environment can be provided, for example radio interface SZ via which storage devices of mobile phone MFG can be accessed remotely (remote access). These various options or types of input/output for inputting and/or outputting information are referred to as "modalities". Because mobile phone MFG shown in FIG. 1 has a large number of input/output devices EA1, EA2 and EA3 which in turn comprise numerous types of input/output or modalities, mobile phone MFG is also referred to as a "multimodal system".

Mobile phone MFG also comprises device BGE for storing user preferences and device characteristics (for instance input/output devices as just explained). It is possible to specify what kind of keypad KBD is allocated to mobile phone MFG and/or what display device DSP and what amount of the display surface is allocated to mobile phone MFG as device characteristics. In addition, mobile phone MFG can have device LAE for local execution of applications (as a Local Application Execution environment). Device LAE comprises a processor which is designed to execute the applications. Interaction Manager IM is used as the central controller or management device of mobile phone MFG because a mobile phone can also be regarded as a client of a central application management unit, referred to as a "client-side interaction manager". The mobile phone is in communication via mobile communication modules (not shown) and antenna ANT with, for example, network infrastructure and/or mobile communication network infrastructure with which a central output page for multimodal services SB and application logic AL are also connected. Modern portable communication units such as mobile phones are currently capable of executing several processes and applications simultaneously. Such applications include software applications which also provide graphic content which can be displayed to the user on a display so that, firstly, the user is informed of the specific status of the application and, secondly, the user can influence execution of the application, for example by means of keypad KBD. This means that if display or display device DSP of the mobile phone is occupied by the graphic output content of one or more applications, other applications have no free display surface for their own display. Output superimposed on subsequently displayed or indicated information is usually troublesome to the user because this distracts the user from executing and monitoring the current application. For instance, windows containing advertising or system messages may pop up and the user has to close them before being able to carry on working. Mobile phone MFG shown in FIG. 1 comprises several precautions in order to tackle such problems. Because individual applications have no overview of other output requirements, according to the exemplary embodiment of the invention in FIG. 1, Interaction Manager IM is designed not only to direct data streams, especially visual data streams, to possible display devices but also to split up and manage the display surface of display DSP or any other displays connected to the mobile phone. Interaction Manager IM does not make the output surface of display DSP available to applications for outputting their graphic output content unrestrictedly—an application is assigned a specific dynamically defined display area. Because Interaction Manager IM acts as a central controller which, as stated earlier, can access device BGE for storing device characteristics, the Interaction Manager knows the real size of display DSP and its display surface and can therefore reserve display areas for applications appropriately and if a large number of applications want to provide output content on display DSP, it can assign a correspondingly reduced display area.

The Interaction Manager assigns appropriate display areas for applications automatically in line with predetermined rules. These rules can be stored in device BGE for example. In accordance with these rules, either the mobile phone itself or the user can assign a specific priority level to applications which specifies the importance of display to the user. This way, a high priority can be assigned to important system messages, for instance alerts that the battery needs charging or the network operator's advertising, and a low priority can be assigned to games applications. Similarly, in accordance with the rules for assigning display areas, it is possible to take into account the fact that certain applications demand a specific minimum required size or a minimum required display area. Furthermore, in accordance with the rules for allocating the display area, it is possible to take into account which application was launched first and which application provides data for output on the display device first. A few examples of the assignment of display areas for applications executed by Local Application Execution environment LAE are described below, reference being made to FIGS. 2 to 4.

Figure 2A:
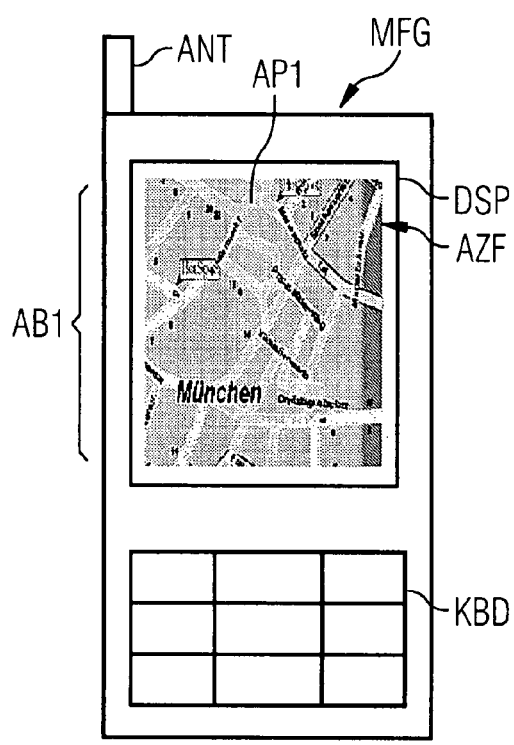
FIGS. 2A and 2B show a first example of managing the display surface in accordance with the present invention.

FIG. 2A shows mobile phone MFG which is shown in FIG. 1, but in a way which focuses more on an external top view of the mobile phone (as seen by the user when executing applications) rather than on the components provided inside the phone. As already mentioned in relation to FIG. 1, mobile phone MFG (viewed externally) has antenna ANT, a display device or display DSP for displaying graphic content and keypad KBD for inputting control instructions, especially instructions to control applications. Also, as shown in FIG. 2A, display DSP has display surface AZF on which the graphic content of a first application is visible, Interaction Manager IM initially having assigned first display area AB1 for outputting the first graphic content of the first application which occupies entire display surface AZF of the display. This means that in the case shown in FIG. 2A, the first application which provides a town map service is initially the first and only application which provides graphic output content for output on display DSP.

Figure 2B:
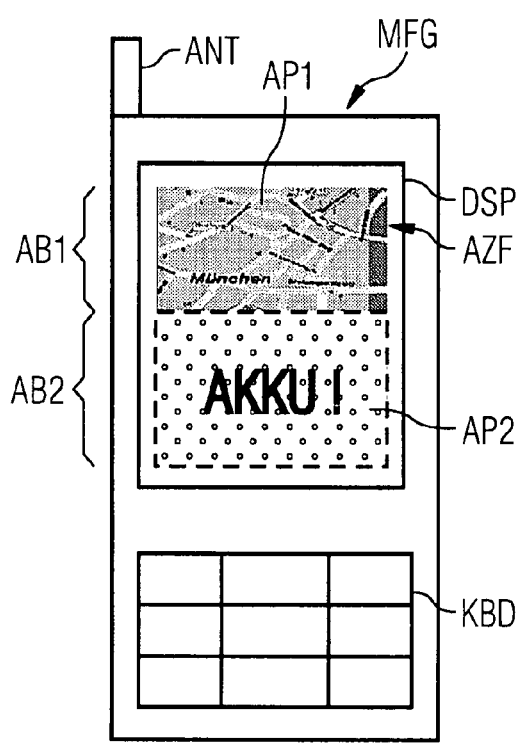

In FIG. 2B there is a second application in addition to the first application, in this case a system application, which provides graphic output content. Because impairment of the first application must be prevented, when the graphic output content of the second application also has to be displayed on display surface AZF, Interaction Manager IM must adjust first display area AB1.

This adjustment of the first display area then takes place as follows in the example shown in FIGS. 2A and 2B. It was previously specified that first application AP1 has a low priority whereas second application AP2 has a high priority because it is a system application which is crucially important to the operation of mobile phone MFG. With regard to priorities, the rule is that applications with a high priority are given a larger display surface than applications having a lower priority. There is another rule that every application must be given a minimum required display area where this is possible. Nevertheless, the application with the higher priority must be given the minimum required display area in every case. Because this rule has been stipulated, Interaction Manager IM, as the central controller for managing display surface AZF, must adjust and reduce first display area AB1.

Because of this first rule, second display area AB2 is then assigned to second application AP2 and, as can be seen in FIG. 2B, AB2 is larger than first display area AB1 because second application AP2 has a higher priority. According to the second rule however, first display area AB1 must not drop below a minimum required size in order to ensure unimpeded continued use of first application AP1. Thus, in the example in FIG. 2B, first display area AB1 is reduced to the minimum required size.

Figure 3A:
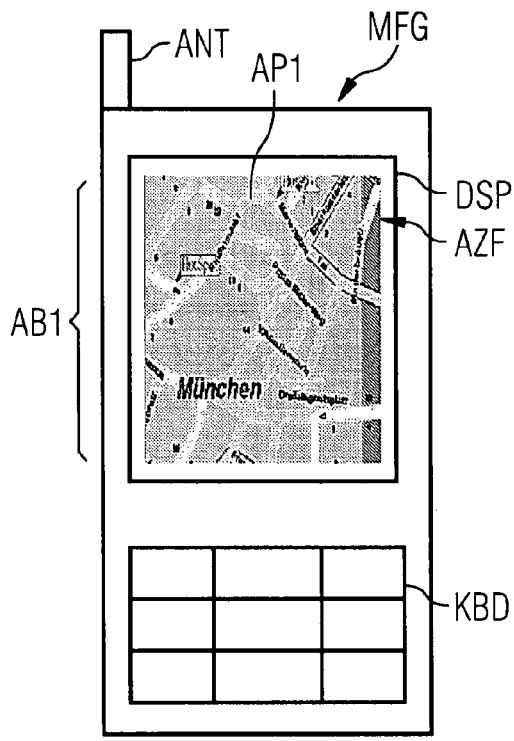
FIGS. 3A and 3B show a second example of managing a display surface in accordance with the present invention.

In order to ensure, furthermore, that graphic output content of the first application can be displayed despite the reduction in display area AB1, the first graphic output content is scaled down so that all the graphic output content of the first application can be displayed, but with different (smaller) dimensions than in FIG. 2A. The advantage of this assignment of display areas AB1 and AB2 in accordance with FIG. 2B is the fact that, firstly, the user can continue using first application AP1 without loss of information and, secondly, due to the size of the display of the graphic content of second application AP2 the user is urgently reminded that the battery of mobile phone MFG is low and needs to be charged or replaced. This means that a background application can be displayed without adversely affecting the foreground application. A second example of managing display surface AZF of display DSP shown in FIGS. 3A and 3B will now be explained. As shown in FIG. 2A, FIG. 3A assumes that first application AP1 in the form of a town map service is executed as first application AP1 with graphic output content which is why all of display surface AZF is made available to this first application as first display area AB1.

Figure 3B:
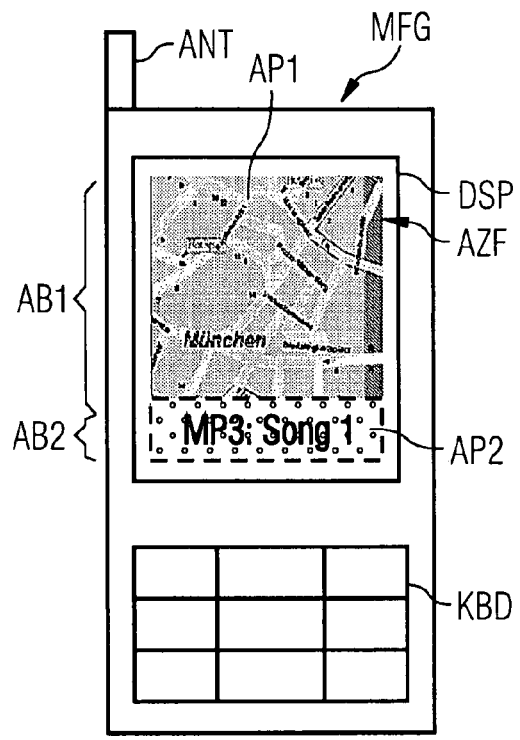
Figure 4A:
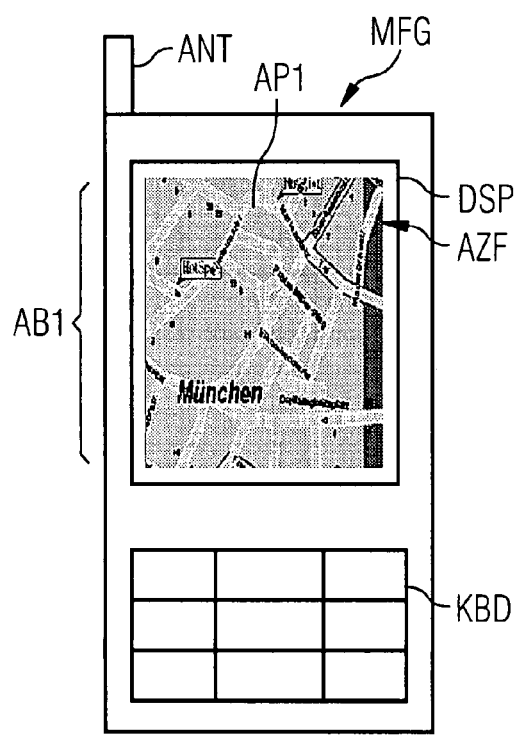
FIGS. 4A and 4B show a third example of managing the display surface in accordance with the present invention.

Looking at FIG. 3B, this shows that a second application AP2 which also provides graphic output content for display on display DSP is being executed. Display areas AB1 and AB2 are then assigned in accordance with the following rules. Firstly it is stipulated that the application which first provides graphic content to output is assigned the larger display area. In this case, this is the first application AP1. There is another rule which stipulates that every application must be assigned a specific minimum required size so that proper execution is possible.

Figure 4B:
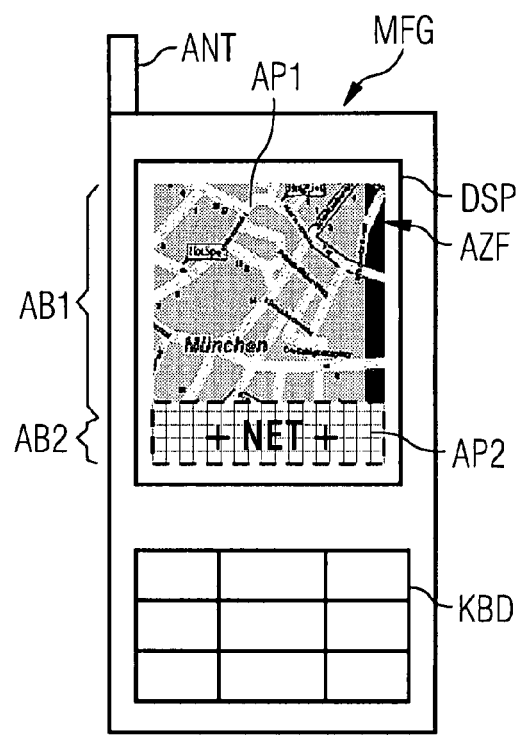

This is why first display area AB1 is then adjusted and reduced so that the minimum required size of second display area AB2 on display surface AZF can be set. Thus, because of both these rules, first application AP1 is assigned the bulk of display surface AZF as display area AB1 whereas second application AP2 for simply displaying status information (in this case a built-in MP3 player of mobile phone MFG1) is only assigned minimum required display area AB2. Because such status information is not very important and, in the present case, merely displays the title of the track being played by the MP3 player, minimum required display area AB2 is sufficient in every case and any adverse effect on the foreground application involving the town map service is minimised. A third example of managing display surface AZF of display DSP of mobile phone MFG shown in FIGS. 4A and 4B will now be explained. As in the previous examples, in FIG. 4A it is assumed that first application AP1 runs a town map service which is assigned all of display surface AZF of display DSP as display area AB1. An advertising message which is to be displayed by second application AP2 is then sent to mobile phone MFG2 by the network operator over network infrastructure N (cf. FIG. 1). As shown in FIG. 4B, it is necessary to reduce first display area AB1 again in order to execute application AP2. By reducing display area AB1, second display area AB2 is assigned to second application AP2 and the network operator's message is visible in AB2. The rules for managing the display surface in this example are described below.

Priorities for the relevant applications are first assigned—as in the first example. Second application AP2 is given a higher priority than first application AP1. According to another rule, a minimum required display area must be assigned to both applications with the application that has the higher priority being assigned the minimum required display area in every case. According to a third rule, the larger display area is made available to the application which first provides graphic content output because this application is regarded as the foreground application. This means that, on the basis of the last rule stated, the larger display area is assigned to the first application because it is the first to provide graphic content output whereas the minimum required display area must be assigned to the second application in every case since it is the application with the higher priority. Thus, second display area AB2 is the minimum required display area for second application AP2 and first display area AB1 is the maximum remaining area of display surface AZF, excluding second display area AB2. This way, foreground application AP1 is only adversely affected to a slight extent by executing second application AP2 and by displaying its content.

The invention claimed is:

1. A method of managing a display device of a portable communication unit, comprising:
   executing a first application on the portable communication unit;
   assigning a first display area of the display device to the first application for outputting first graphic output content;
   executing a second application on the portable communication unit;
   assigning a second display area of the display device to the second application for outputting second graphic output content with the relevant display areas being assigned so that they do not overlap;
   assigning a priority to the first application and the second application with a size of the relevant display areas being determined depending on the assigned priority;
   assigning a higher priority to system applications than non-system applications, the system applications to provide system related messages; and
   assigning a larger display area to the application having the higher priority, the larger display area to display the system related messages when the application is a system application.

2. The method according to claim 1, comprising adjusting the first display area to define the second display area for the second application.

3. The method according to claim 1, comprising predetermining a minimum required display area for the application.

4. The method according to claim 1, comprising:
   predetermining a minimum required display area for the application; and
   assigning at least the minimum required display area to the application having the higher priority.

5. The method according to claim 1, comprising predetermining the size of the relevant display area for an application depending on which application was executed first.

6. The method according to claim 5, comprising assigning the larger display area to the application which was executed first.

7. The method according to claim 1 comprising, in the event of adjustment in the form of a reduction in the first display area because of assignment of a second display area, adjusting the scaling of the first graphic output content in order that the entire first output content can continue to be displayed.

8. A portable communication unit comprising:
   a display device with a display surface for displaying graphic content;
   a processor for executing a first application and a second application which each provide graphic output content; and
   a controller for:
      managing the graphic display surface of the display device,
      assigning a first display area to the first application,
      assigning a second display area to the second application on the display surface of the display device so that there is no overlapping of display areas,
      assigning a priority to the first application and the second application with a size of the relevant display areas being determined depending on the assigned priority,
      assigning a higher priority to system applications than non-system applications, the system applications to provide system related messages, and assigning a larger display area to the application having the higher priority, the larger display area to display the system related messages when the application is a system application.

9. The portable communication unit according to claim 8, the controller assigning a first display area to the first application and adapting the first display area in order to determine the second display area for the second application.

10. The portable communication unit according to claim 8, which is designed as at least one of a mobile radio device and a portable computer.

11. The portable communication unit according to claim 9, which is designed as at least one of a mobile radio device and a portable computer.

12. A portable communication unit comprising:
a display device comprising a display surface to display graphic content; and
a circuit to:
manage the graphic display surface of the display device,
assign a first display area to a first application,
assign a second display area to a second application on the display surface of the display device so that the first display area does not overlap the second display area,
assign a priority to the first application and the second application with a size of the relevant display areas being determined depending on the assigned priority,
assign a higher priority to a system application than a non-system application, the system application to provide system related messages, and
assign a larger display area to the application having the higher priority, the larger display area to display the system related messages when the application is a system application.

13. The portable communications unit of claim 12, the first application to provide a first display output and the first display area to provide a display of substantially the entire first display output.

14. The portable communications unit of claim 12, the circuit to rescale information displayed based on the first application in order to display information from the second application.

15. The portable communications unit of claim 12, the unit is a mobile radio device.

16. The portable communications unit of claim 12, the unit is a portable computer.

17. The portable communications unit of claim 12, the circuit to assign at least one of the first display area to the first application and the second display area to the second application based on a minimum required display area for the first application.

18. A portable communication unit comprising:
a display having a display surface to display graphic content;
a means for assigning a first display area of the display to a first application and assigning a second display area of the display to a second application so that the first display area does not overlap the second display area;
a means for assigning a priority to the first application and the second application with a size of the relevant display area being determined depending on the assigned priority;
a means for assigning a higher priority to a system application than a non-system application, the system application to provide system related messages; and
a means for assigning a larger display area to the application having the higher priority, the larger display area to display the system related messages when the application is a system application.

* * * * *